United States Patent [19]

Goto

[11] Patent Number: 4,590,026

[45] Date of Patent: May 20, 1986

[54] PROCESS FOR MAKING REINFORCING LAYERS ON INNER SURFACES OF COMPLICATED CAVITIES

[75] Inventor: Fumio Goto, Kurashiki, Japan

[73] Assignee: Namba Press Works Co. Ltd., Japan

[21] Appl. No.: 621,696

[22] Filed: Jun. 18, 1984

[30] Foreign Application Priority Data

Jun. 20, 1983 [JP] Japan .................. 58-109412

[51] Int. Cl.⁴ .................. B29C 33/52
[52] U.S. Cl. .................. 264/221; 264/242; 264/317
[58] Field of Search .................. 264/221, 242, 317

[56] References Cited

U.S. PATENT DOCUMENTS

| | | | |
|---|---|---|---|
| 2,628,166 | 2/1953 | Haller | 264/242 X |
| 3,405,212 | 10/1968 | Fraser et al. | 264/221 |
| 3,654,009 | 4/1972 | Judd et al. | 264/221 X |
| 3,882,220 | 5/1975 | Ryder | 264/221 |

FOREIGN PATENT DOCUMENTS

| | | | |
|---|---|---|---|
| 57-3829 | 1/1982 | Japan | 264/317 |
| 58-89343 | 5/1983 | Japan | 264/221 |
| WO83/01592 | 5/1983 | PCT Int'l Appl. | 264/221 |

Primary Examiner—Jan Silbaugh
Attorney, Agent, or Firm—Renner, Kenner, Greive, Bobak & Taylor

[57] ABSTRACT

A process for forming reinforcing layers or films on the complicated configured interior surfaces of a unitary molded plastic body consisting of providing soluble or meltable inert core member, applying ceramic or metallic reinforcing layers or films onto outer surfaces of the core member except its longitudinal ends, placing the core member covered with the reinforcings in the mold cavity, molding a plastic body around and integrally with the reinforcing layers or films on the core member, and fluidizing the core member to remove the same from the interior of said plastic body leaving the reinforcing layers or films on the interior surfaces of the plastic body.

10 Claims, 5 Drawing Figures

PROCESS FOR MAKING REINFORCING LAYERS ON INNER SURFACES OF COMPLICATED CAVITIES

TECHNICAL FIELD

The present invention relates to a process for making reinforcing layers or films on inner surfaces of cavities having complicated configurations, and more particularly to a process for making such layers or films on the inner surfaces of cavities having complicated configurations inaccessible from the outside by the use of core members carrying on their outer surfaces reinforcing layers or films to be transferred to the inner surfaces of the cavities through the injection or transfer molding processes.

BACKGROUND ART

Molded plastic articles are widely employed because they can easily be manufactured in various desired shapes by the use of molding techniques. Such articles, however, have some defects such, for example, as generally low rigidity, tendencies to be deformed and degraded when subjected to elevated temperatures, poor resistance to abrasion, and possible cracking, swelling and dissolving caused by some chemicals and solvents. Consequently, in some technical and industrial fields, there is no option but to employ, instead of molded plastic products, metallic products which are inferior because of the necessity for producing them by splitting or dividing the entire product into two or more component parts and combining them as by welding and the like.

For offsetting defects as noted above and recovering superior moldability of the plastics, such techniques as nickel or chromium plating as well as sputtering have been utilized in the prior art to form very thin protective films on the outer surface of the molded plastics. It is, however, very difficult employing the prior art practices to form such protective films in uniform thickness on the inner surfaces of the cavities in the molded plastics, especially for inwardly flared shapes inaccessible from the outside, and almost impossible to form such films as thick as from 0.3 to 0.7 mm. Moreover, it is completely impossible to apply reinforcing films or layers of ceramic or metallic material onto the inner surfaces of the cavities of the complicated shapes in the molded plastic articles because ceramic or metallic materials have very high melting points and may cause degradation of molded plastic articles when applied at high melting temperatures. Ceramic material is evaluated as very resistive material having superior properties, but is not fully utilized especially in combination with moldable plastic materials.

DISCLOSURE OF THE INVENTION

Accordingly, it is an object of the present invention to provide a process for making reinforcing layers or films of ceramic or metallic material on the inner surfaces of the cavities formed in the molded plastic articles.

It is another object of the present invention to provide a novel molded plastic article having improved properties and functions in relation to the prior art by combining superior moldability of plastic materials with high resistivity of ceramic or metallic materials. Another object of the present invention resides in providing unitary molded plastic articles having complicated and inaccessible cavities which can easily be provided with reinforcing or protective layers or films of different materials on the inner surfaces of the cavities in desired and uniform thickness. Thus, molded plastic articles may find a new and wide variety of applications requiring a high degree of resistance to heat, abrasion, chemicals, oil and other corrosives.

In accordance with the process of the present invention, reinforcing or protective layers or films having high degree of heat-resistance, abrasion-resistance, chemical-resistance, oil-resistance and other properties can be formed easily and uniformly in the interior of the molded plastic articles such as, for example, check valves, which otherwise would not be able to be manufactured as unitary molded articles.

The process of the present invention generally comprises the steps of:

(a) providing a core member of inert material composed of, for example, molding sands and soluble salts, (b) forming reinforcing or protective layers or films of ceramic material such as aluminum oxide, zirconium oxide and silicon carbide, or metallic material such as zinc, tin or aluminum and alloys thereof, onto the outer surfaces of the core member except its ends, (c) inserting the core member supporting the reinforcing or protective layers or films on its outer surfaces into the mold cavity for injection or transfer molding, (d) molding a unitary plastic body around the reinforcing layers or films supported by the core member, and (e) removing the core member by dissolving or melting the core to leave the reinforcing layers or films integral with the interior surfaces of the molded plastic article.

The ceramic or metallic reinforcing material may be prepared in the form of dust or powder of the material selected from the group as described above, mixed with suitable fillers or carriers, if necessary, and be applied onto the core member by fusing or melting the same by flame or plasma and spraying the fused material by means of an appropriate spray gun.

The reinforcing or protective layers of films may also be made from organic coating material such as, for example, teflon, nylon, etc., which will be applied onto the outer surfaces of the core member by spraying or brushing the same in desired thickness.

PREFERRED EMBODIMENT FOR CARRYING OUT THE INVENTION

Figure 1:
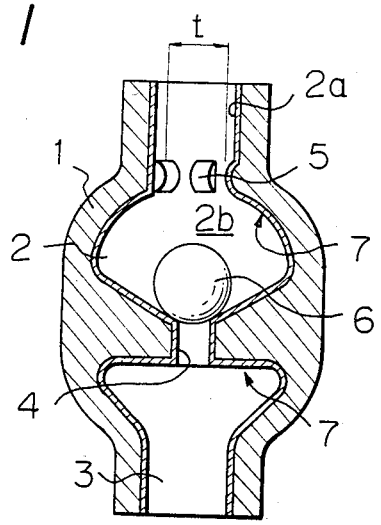
FIG. 1 shows a longitudinal sectional view of a unitary molded plastic article having an inner reinforcing layer formed in accordance with the process of the invention.

Referring now to the drawings, the process of the present invention will be described in connection with a unitary molded plastic check valve having an inner reinforcing layer on its complicated interior surfaces, which is an example of unitary molded plastic articles obtainable in accordance with the present invention.

A check valve shown in FIG. 1 has a unitary casing body 1 molded from plastic material through, e.g., the injection molding technique. The casing body 1 has an upper interior chamber 2 and a lower interior chamber 3, both having complicated configurations flaring inwardly. An orifice 4 communicates the upper chamber 2 with the lower chamber 3. The upper chamber 2 is provided with a plurality of projections 5 between its neck portion 2a and the flared inward portion 2b. In the flared inward portion 2b is contained a ball 6 having a diameter larger than the spacing t between the tops of the projections 5. Layers or films 7 of ceramic or metallic reinforcing material are applied onto the entire surfaces of the upper and lower chambers 2 and 3 and the orifice 4. The casing body 1 is obtained as a unitary molded plastic article having such reinforcing films or layers 7 on its complicated interior surfaces in accordance with the process of the invention.

Figure 2:
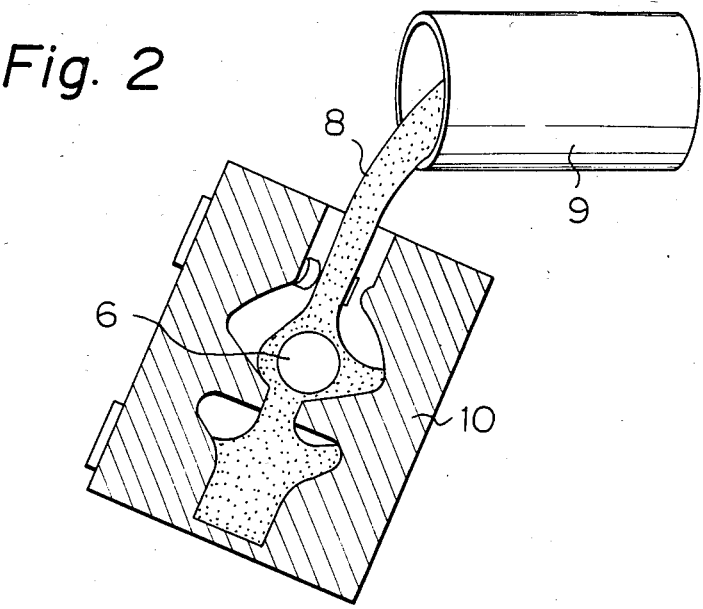
FIG. 2 shows schematically a step for forming a core member to be used in the process of the invention.
Figure 3:
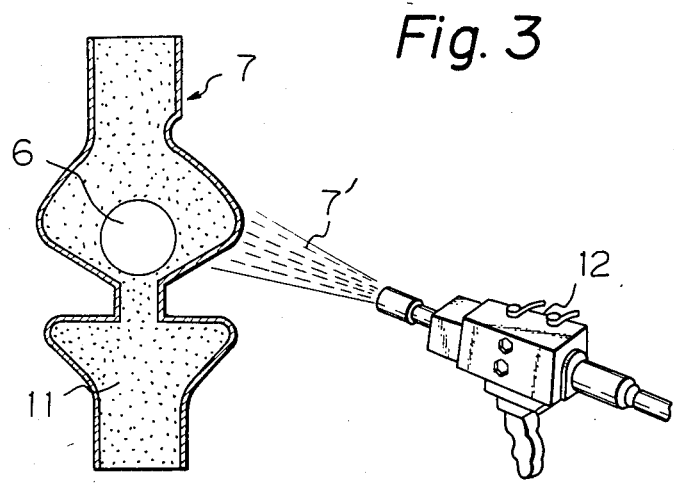
FIG. 3 shows the second step of the process of the invention for applying a ceramic reinforcing layer onto the outer surface of the core member.

Referring to FIG. 2, the first step of the process of the invention is to make core members having complicated contours corresponding to the desired interior configurations of the unitary molded plastic articles. For making a core member, inert material composition 8 is poured from its container 9 into a core box 10. The core box 10 may be of the conventional type which is divided and separable into two or more parts in order to place therein a ball 6 or other functional components. Inert core material 8 may be composed of, for example, a mixture of molding sand and soluble or meltable inorganic salts. A preferred example of inert core material is a mixture of molding sand of about 300 meshes and combined sodium nitrate and potassium nitrate having a melting point of 221° C. Such sand and salts are mixed homogeneously at a temperature of about 250° C. and then poured into the core box 10 heated to 60°–70° C. to form the core member 11 having the desired contour as shown in FIG. 3.

The core member 11 is then subjected to the second step of the process of the invention in which ceramic or metallic reinforcing layers or films 7 are applied onto the entire surfaces of the core member except end surfaces. The reinforcing layers or films 7 are formed preferably by spraying fused metallic or ceramic dusts 7' onto the outer side surfaces of the core member 11 by means of an appropriate sprayer 12 utilizing a plasma or flame fusion system. A preferred example of ceramic dust 7' is powdery aluminum oxide, which is to be fused and applied by the use of plasma fusion system. Preferably, the ceramic layer may be formed on the outer side surfaces of the core member 11 by spraying fused ceramic material onto the surfaces of the core for a few seconds in a very thin film followed by a rest of few seconds to allow the core member to be cooled, and repeating such spraying and rest until the reinforcing layer of the desired thickness is obtained on the core member. As the thickness reaches the value of the order of 0.3 mm, spraying may be done more rapidly. Optimum thickness of the layer is preferably of 0.7 mm considering the difference of coefficients of thermal expansion, though exact value of thickness depends on the particular requirements as well as functions and costs of the layers.

Figure 4:
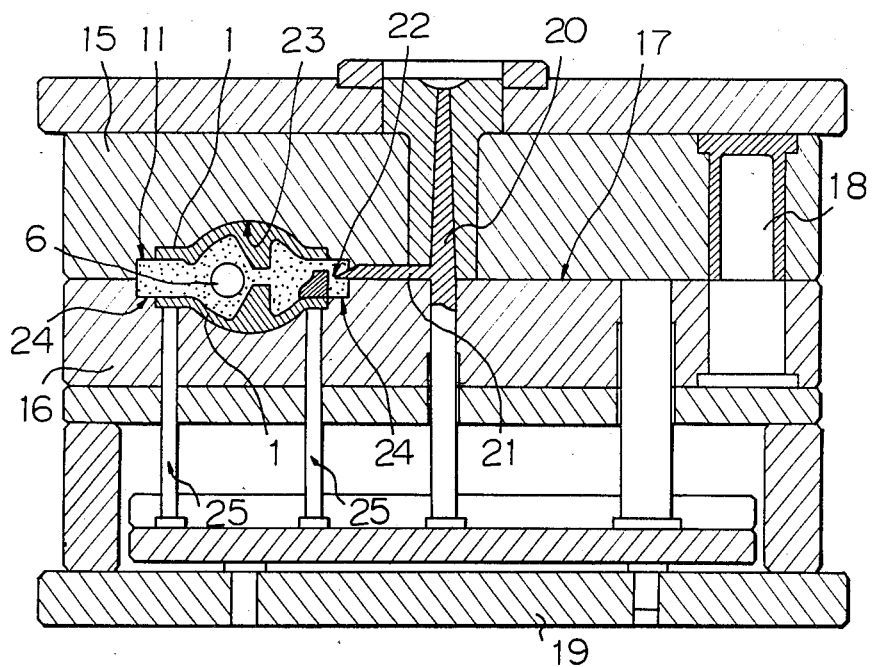
FIG. 4 shows the third step of the process of the invention wherein the core member having outer reinforcing layers is inserted in the mold of the injection molding machine and a plastic body is molded around the layers.

The core member 11 covered with reinforcing layers 7 is then placed in the mold of the injection molding machine as shown in FIG. 4. The molding machine has a stationary upper mold half 15 and a movable lower mold half 16 which is closed on a parting face 17. The lower mold half 16 is movable along guide pins 18 supported on the mounting plate 19. The machine is provided with a sprue 20, a runner 21 and a gate 22 for supplying fluidized plastic material into a molding cavity 23 as in the usual injection molding machine. The core member 11 is inserted in the cavity 23 by supporting its ends on the support shoulders 24 formed in the cavity 23. Then, plastic material is injected through the sprue 20, the runner 21 and the gate 22 into the space around the core member 11 placed in the cavity 23 to form the unitary molded plastic article containing the core member therein.

Insofar as the core member is covered with the ceramic reinforcing layer, the plastic material to be used for injection molding may be widely selected from various compounds among which are polyethylene, polypropylene and ABS copolymers as well as engineering plastics such as nylon, polyethylene terephthalate, polybutylene terephthalate, and the like. In addition to these thermoplastic materials, thermosetting material such as BMC (bulk molding compound) including unsaturated polyesters and glass fibers may be employed in the injection molding or the transfer molding processes.

Figure 5:
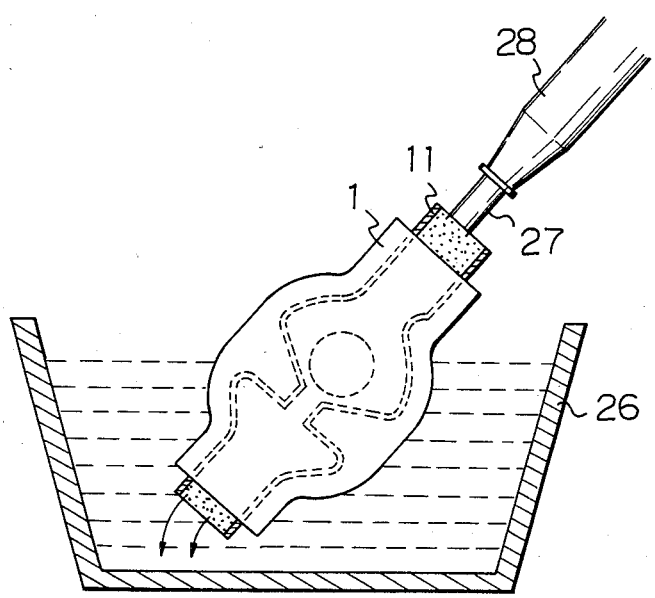
FIG. 5 shows the last step of the process of the invention for removing the core member from the interior of the molded plastic article and leaving the ceramic reinforcing layer onto and integrally with the interior surface of the molded plastic article.

The molded article having the core member 11 therein is removed from the molding machine by the action of ejecting pins 25. Such article is subjected to the final step of the process of the invention as shown in FIG. 5 wherein the article is placed in an appropriate reservoir 26 and receives at its end a jet flow of water 27 from a nozzle 28 to dissolve the core member 11. The core member 11 may also be removed from the molded plastic casing 1 by another method such as heating the core member to melt the salts contained in inert material. Thus, the article is obtained as shown in FIG. 1 having the inner reinforcing layer 7 on its complicated inner surfaces.

It will be noted from the foregoing description that the unitary molded plastic article produced in accordance with the present invention can advantageously be employed in such technical and industrial fields as those requiring high resistivity and durability for which plastic material has been deemed inappropriate and can take the place of metallic articles which are composed of two or more component parts requiring assembly or combining the same by the use of bolts and nuts, packings or welding operation. Thus, the present invention provides considerable decrease in the number of component parts and the manufacturing steps of the mechanical products and also contributes to reduction in size, weight and cost of the same.

Further, the unitary molded plastic articles of the present invention have excellent functions and properties in that they have no seam nor joint which would lead to leakage or the like and are of very high durability due to the known properties of ceramic or metallic material combined integrally with the plastic.

More importantly, the present invention provides unitary molded plastic articles substantially free from undesirable cracking and/or bulging by the fact that the reinforcing layers or films applied inside the plastic body have a generally lower coefficient of thermal expansion than that of the plastic body, and stresses imposed to the interior layers or films due to the difference of thermal expansion coefficients are substantially smaller as compared to the case in which protective films are applied to the outer surfaces of the plastic body as by plating, sputtering or spraying. The process of the present invention, therefore, assures stabilization of product quality and permits high productivity of uniform products.

I claim:

1. Process for reinforcing inner surfaces of complicated and inaccessible cavities of a unitary molded plastic article with metallic or ceramic material, comprising the steps of:
   (a) making a core member having outer surfaces of complicated and irregular configurations complementary to said complicated and inaccessible cavities of the molded plastic article to be obtained from water-soluble or heat-meltable inert material, said core member being of a length between its end surfaces greater than the length of a mold cavity to be used,
   (b) applying metallic or ceramic reinforcing material onto said complicated and irregular outer surfaces of said core member except said end surfaces at temperature above the degradation temperature of the plastic material subsequently used to form said molded plastic article to form a reinforcing layer of sufficient thickness to impart desired mechanical strength and resistance to abrasion and chemicals to the molded plastic article,
   (c) placing said core member covered with said reinforcing layer into a mold cavity formed by two mold halves for injection or transfer molding in such a manner that a continuous spacing necessary to form the molded plastic article is left between said reinforcing layer and the inner surface of said mold cavity, and securing end portions of said core member extending beyond said mold cavity between said mold halves by closing the same,
   (d) injecting molten plastic material into said continuous spacing to form a unitary plastic body around and integrally with said reinforcing layer, and
   (e) removing said plastic body containing therein said reinforcing layer and said core member from said mold cavity, and then applying water or heat to said core member thereby to fluidize and remove said inert material from said plastic body to leave said reinforcing layer therein integral with said plastic body, thus producing the unitary molded plastic article having on its complicated and inaccessible cavity surfaces the reinforcing metallic or ceramic layer.

2. The process as claimed in claim 1 wherein said water-soluble inert material is a mixture of molding sands and soluble salts.

3. The process as claimed in claim 2 wherein said soluble salts are sodium nitrate and potassium nitrate.

4. The process as claimed in claim 1 wherein said metallic material for reinforcing layer is selected from the group consisting of zinc, tin, aluminum, and alloys thereof.

5. The process as claimed in claim 4 wherein said metallic material is in the form of dusts or powder and applied onto said core member in a fused condition by spraying.

6. The process as claimed in claim 1 wherein said ceramic material for reinforcing layer is selected from the group consisting of aluminum oxide, zirconium oxide, silicon carbide and mixtures thereof.

7. The process as claimed in claim 6 wherein said ceramic material is in the form of dusts or powder and applied onto said core member in a fused condition by spraying.

8. The process as claimed in claim 1 wherein said reinforcing layer is formed in thickness of from 0.3 to 0.7 mm on said core member.

9. The process as claimed in claim 1 wherein said core member has a ball or other functional component contained within said inert material.

10. The process as claimed in claim 1 wherein plastic material constituting said body is selected from the group consisting of polyethylene, polypropylene, ABS resins, nylon, polyethylene terephtalate, polybutylene terephtalate and BMC.

* * * * *